(12) United States Patent
Miheli et al.

(10) Patent No.: US 11,841,096 B2
(45) Date of Patent: *Dec. 12, 2023

(54) UNIVERSAL PIPE SLEEVE JUNCTION FOR AN ASPIRATED SMOKE DETECTION SYSTEM

(71) Applicant: Honeywell International Inc., Charlotte, NC (US)

(72) Inventors: Mauro Miheli, Trieste (IT); Lorenzo Feurra, Ronchi dei Legionari (IT); Gianluca Pace, Trieste (IT)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,967

(22) Filed: Dec. 19, 2022

(65) Prior Publication Data

US 2023/0124952 A1   Apr. 20, 2023

Related U.S. Application Data

(63) Continuation of application No. 16/506,384, filed on Jul. 9, 2019, now Pat. No. 11,543,057.

(51) Int. Cl.
*F16L 41/02* (2006.01)
*F16L 21/00* (2006.01)
(Continued)

(52) U.S. Cl.
CPC ............ *F16L 21/002* (2013.01); *A62C 35/68* (2013.01); *F16L 41/021* (2013.01); *G08B 17/10* (2013.01)

(58) Field of Classification Search
CPC ....... F16L 41/021; F16L 41/008; F16L 55/11; F16L 55/115; F16L 41/08; F16L 21/002; G01N 1/26; G08B 17/10
See application file for complete search history.

(56) References Cited

U.S. PATENT DOCUMENTS 2,706,134 A   4/1955   Wilson et al.
2,752,228 A   6/1956   Gould
(Continued)

FOREIGN PATENT DOCUMENTS

CA   2863272 A1   3/2016
DE   102004027180 A1   12/2005
(Continued)

OTHER PUBLICATIONS

Extended European Search Report for related EP Application No. 20184825.6, dated Nov. 6, 2020 (9 pgs).
(Continued)

*Primary Examiner* — David Bochna
(74) *Attorney, Agent, or Firm* — Brooks, Cameron & Huebsch, PLLC

(57) ABSTRACT

Methods, devices, and systems for a universal pipe sleeve junction for an aspirated smoke detection system are described herein. In some examples, one or more embodiments include a sleeve body having an outer surface and an inner surface, the inner surface defining an opening through the sleeve body, wherein the sleeve body further includes a first end surface and a second end surface opposite the first end surface, and a nozzle having an outer surface and an inner surface, the inner surface of the nozzle defining an opening through the nozzle and extending through to the inner surface of the sleeve body, where the nozzle opening is configured to couple with a pipe sleeve attachment mechanism.

20 Claims, 8 Drawing Sheets

(51) Int. Cl.
    *A62C 35/68*     (2006.01)
    *G08B 17/10*     (2006.01)

(56) References Cited

U.S. PATENT DOCUMENTS

| | | | |
|---|---|---|---|
| 3,376,052 | A | 4/1968 | Zimmerer et al. |
| 3,820,826 | A | 6/1974 | Ligon |
| 4,627,646 | A | 12/1986 | Kessel |
| 5,630,629 | A | 5/1997 | Moessinger |
| 5,665,924 | A | 9/1997 | Cole |
| 6,143,090 | A | 11/2000 | Lietz |
| 6,367,507 | B1 | 4/2002 | Legeai |
| 6,988,747 | B2 | 1/2006 | Allen et al. |
| 9,989,443 | B2 | 6/2018 | Knox |
| 11,543,057 | B2 * | 1/2023 | Miheli ................ F16L 41/008 |
| 2005/0128098 | A1 | 6/2005 | Russwurm et al. |
| 2005/0285400 | A1 | 12/2005 | Feith |
| 2007/0236010 | A1 | 10/2007 | Campau |
| 2008/0105311 | A1 | 5/2008 | Bulter |
| 2016/0076682 | A1 | 3/2016 | Conrad |
| 2016/0238495 | A1 | 8/2016 | Joseph |
| 2018/0149559 | A1 | 5/2018 | Williamson |
| 2018/0263199 | A1 | 9/2018 | Duffin et al. |
| 2019/0368854 | A1 | 12/2019 | Miheli et al. |

FOREIGN PATENT DOCUMENTS

| | | |
|---|---|---|
| DE | 202009008589 U1 | 12/2009 |
| EP | 0880765 B1 | 1/2000 |
| EP | 0880767 B1 | 1/2000 |
| EP | 1542188 A1 | 6/2005 |
| EP | 1868173 A2 | 12/2007 |
| EP | 2581889 A1 | 4/2013 |

OTHER PUBLICATIONS

Wagner, "Air Sampling Smoke Detection Systems"; International Product Catalogue 2007 (10 pgs).

Wagner, "Intake Reduction and Pipe Hood"; German-Language Product Catalog 2020 (1 pg).

* cited by examiner

UNIVERSAL PIPE SLEEVE JUNCTION FOR AN ASPIRATED SMOKE DETECTION SYSTEM

PRIORITY INFORMATION

This application is a continuation of U.S. application Ser. No. 16/506,384, filed Jul. 9, 2019, which issued as U.S. Pat. No. 11,543,057 on Jan. 3, 2023, the contents of which are incorporated by reference.

TECHNICAL FIELD

The present disclosure relates to methods, devices, and systems for a universal pipe sleeve junction for an aspirated smoke detection system.

BACKGROUND

Facilities, such as commercial facilities, office buildings, hospitals, and the like, may have control systems that can be used during an emergency situation, such as, for instance, a fire, to manage the emergency situation in and/or around the facility. Such control systems may rely on detection systems to detect a fire, such as an aspirated smoke detection system. An aspirated smoke detection system can be a system having a detection unit which draws air through a network of pipes to detect smoke. For example, a facility may utilize a series of pipes located throughout the facility that can draw air from various spaces in the facility to the detection unit to detect smoke.

The aspirated smoke detection system may utilize such pipes in order to sample various locations in the facility for smoke. For example, the pipes may include sampling points located in the various locations in the facility through which air is drawn into the pipe system. Upon detection of smoke, other fire hardware devices may activate, such as audible alarms, visual alarms, pre-programmed messages on a display, etc.

DETAILED DESCRIPTION

Figure 1:
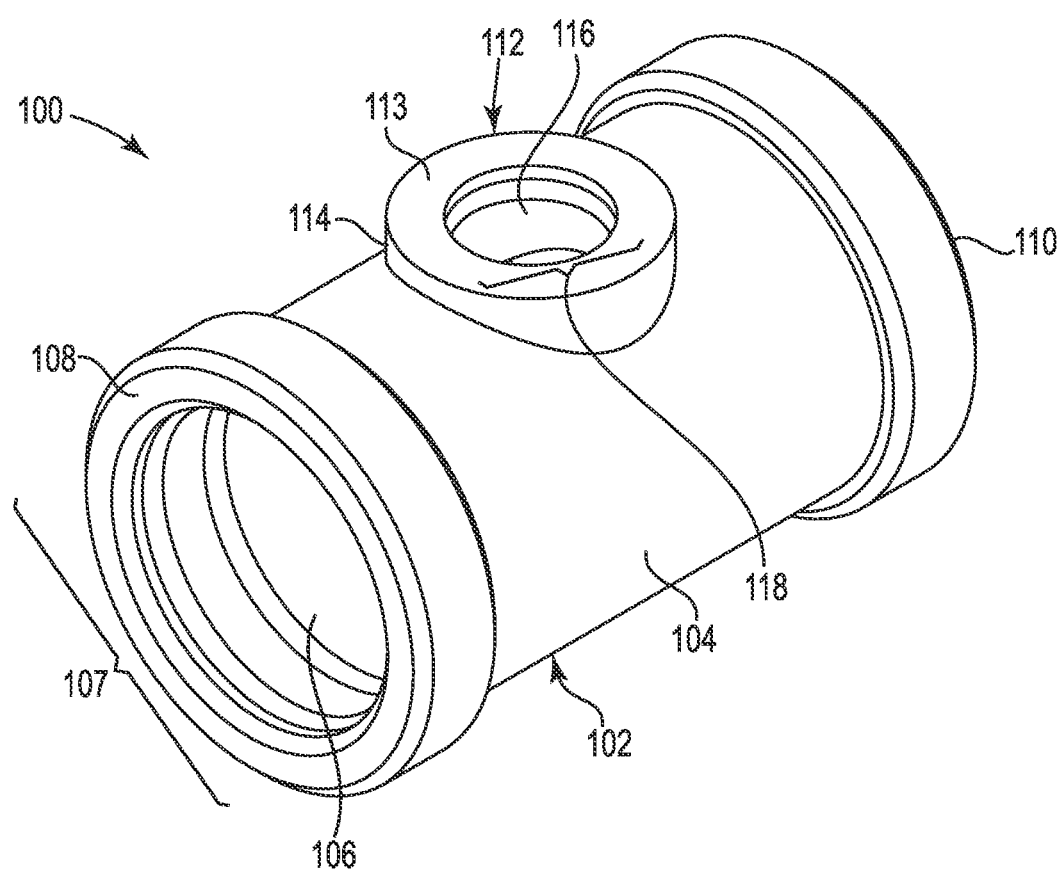
FIG. 1 is an example of a perspective view of a universal pipe sleeve junction for an aspirated smoke detection system, in accordance with one or more embodiments of the present disclosure.

Methods, devices, and systems for a universal pipe sleeve junction for an aspirated smoke detection system are described herein. In some examples, one or more embodiments include a sleeve body having an outer surface and an inner surface, the inner surface defining an opening through the sleeve body, wherein the sleeve body further includes a first end surface and a second end surface opposite the first end surface, and a nozzle having an outer surface and an inner surface, the inner surface of the nozzle defining an opening through the nozzle and extending through to the inner surface of the sleeve body, where the nozzle opening is configured to couple with a universal pipe sleeve junction attachment mechanism.

As described above, an aspirated smoke detection system of a facility may utilize a series of pipes located throughout the facility that draw air from various spaces in the facility to detect smoke. For example, sampling point holes may be drilled into various locations of the pipe in order to draw air from the various spaces into the pipes.

In order to accommodate the layout of the facility, the pipes may be joined together via a universal pipe sleeve junction. As used herein, the term "universal pipe sleeve junction" refers to a covering that creates a barrier between a pipe and its surroundings. For example, a universal pipe sleeve junction can connect to a portion of pipe (e.g., at a junction) by creating a barrier between the portion of pipe and the universal pipe sleeve junction and an area exterior to the portion of the pipe and the universal pipe sleeve junction. As a result, gas transiting between the portion of pipe and the universal pipe sleeve junction does not exit the pipe at the junction of the portion of pipe and the universal pipe sleeve junction, nor does gas located outside of the portions of pipe and the universal pipe sleeve junction enter the portion of pipe and the universal pipe sleeve junction.

In previous approaches, glue may be used to attach the pipe with a pipe sleeve. For example, a pipe sleeve may be glued to a portion of pipe in order to connect the portion of pipe and the pipe sleeve together. However, glue may take time to dry, resulting in delays in commissioning, testing, and/or utilizing the aspirated smoke detection system while the glue dries.

Due to the layout of certain facilities, additional parts such as line end caps may be utilized to cap a portion of pipe. For example, in order to cap a portion of pipe of the aspirated smoke detection system, a line end cap may be utilized to stop flow of gas in the pipe in a certain direction. However, line end caps can be additional parts in the aspirated smoke detection system, which can increase installation and/or commissioning times, as well as costs.

A universal pipe sleeve junction for an aspirated smoke detection system, in accordance with the present disclosure, can allow for a universal pipe sleeve junction to join two portions of pipe, include a sampling point to draw air from various spaces to detect smoke, and/or receive a line end cap to cap a portion of the aspirated smoke detection system. Utilizing such a universal pipe sleeve junction can allow for safer installation procedures, as drilling a section of pipe to create a sampling point in the pipe can be avoided. Additionally, the universal pipe sleeve junction can be installed without the use of glue, resulting in faster and easier installation as components don't need to be positioned while the glue polymerizes. Further, utilizing the universal pipe sleeve junction can result in faster testing and/or commissioning of the aspirated smoke detection system, which can lower the time to operation of the aspirated smoke detection system. Further, since the universal pipe sleeve junction can join portions of pipe, include a sampling point, and/or receive a line end cap, costs for installing an aspirated smoke detection system can be reduced as fewer parts are required as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 106 may reference element "06" in FIG. 1, and a similar element may be referenced as 206 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of a perspective view of a universal pipe sleeve junction 100 for an aspirated smoke detection system, in accordance with one or more embodiments of the present disclosure. As shown in FIG. 1, the universal pipe sleeve junction 100 can include a sleeve body 102 and a nozzle 112. The sleeve body 102 can include an outer surface 104, an inner surface 106, an opening 107, a first end surface 108, and a second end surface 110. The nozzle 112 can include a cap surface 113, an outer surface 114, an inner surface 116, and an opening 118.

The universal pipe sleeve junction 100 can be utilized in an aspirated smoke detection system. For example, the universal pipe sleeve junction 100 can join two portions of pipe in an aspirated smoke detection system together (e.g., as is further described in connection with FIGS. 3-6), receive a calibrated sampling point cap (e.g., as is further described in connection with FIGS. 3-4), receive a plug cap (e.g., as is further described in connection with FIGS. 5-6), and/or attach to a portion of pipe and receive a line end cap (e.g., as is further described in connection with FIGS. 7-8), among other examples.

The inner surface 106 of the sleeve body 102 can define an opening 107 through the sleeve body 102. The opening 107 of the sleeve body 102 can be of a shape and/or dimension to receive a portion of a pipe (e.g., as is further described in connection with FIGS. 3-8) and/or a line end cap (e.g., as is further described in connection with FIGS. 7-8).

The first end surface 108 of the sleeve body 102 can be oriented such that the first end surface 108 is substantially perpendicular to a pipe in an example in which the sleeve body 102 couples with (e.g., receives) a pipe in the opening 107 of the sleeve body 102. In some examples in which the sleeve body 102 couples with (e.g., receives) a line end cap, the first end surface 108 can be adjacent to a surface of the line end cap.

The second end surface 110 of the sleeve body 102 can be located opposite of the first end surface 108 and can be oriented such that the second end surface 110 is substantially perpendicular to a pipe in an example in which the sleeve body 102 couples with (e.g., receives) a pipe in the opening 107 of the sleeve body 102. In some examples in which the sleeve body 102 couples with (e.g., receives) a line end cap, the second end surface 110 can be adjacent to a surface of the line end cap.

The opening 107 can extend through the sleeve body 102 from the first end surface 108 to the second end surface 110. As a result, gas flowing from the first end surface 108 (e.g., from a pipe coupled to the first end surface 108 of the universal pipe sleeve junction 100) to the second end surface 110 (e.g., to a pipe coupled to the second end surface 110 of the universal pipe sleeve junction 100) can transit the sleeve body 102, as is further described in connection with FIGS. 2-8.

The universal pipe sleeve junction 100 can include a nozzle 112. As used herein, the term "nozzle" refers to a projecting spout of a chamber. For example, the nozzle 112 can project from the outer surface 104 of the sleeve body 102.

The inner surface 116 of the nozzle 112 can define an opening 118 of the nozzle 112 extending through to the inner surface 106 of the sleeve body 102. As a result, gas flowing from an exterior of the universal pipe sleeve junction 100 to the opening 107 via an annulus of a calibrated sampling point cap can transit the nozzle 112 for use in smoke detection, as is further described in connection with FIGS. 3-4.

The first end surface 108, the second end surface 100, and/or the nozzle opening 118 can couple with (e.g., receive) a pipe sleeve attachment mechanism. As used herein, the term "pipe sleeve attachment mechanism" refers to a structure designed to perform a specified function. For example, a pipe sleeve attachment mechanism can be a structure that performs a particular function when attached to the universal pipe sleeve junction 100. For instance, the pipe sleeve attachment mechanism can be a calibrated sampling point cap (e.g., a structure that allows gas exterior to the universal pipe sleeve junction 100 to be drawn into the universal pipe sleeve junction 100 via the nozzle opening 118, as is further described in connection with FIGS. 3-4), a plug cap (e.g., a structure that prevents gas exterior to the universal pipe sleeve junction 100 from being drawn into the universal pipe sleeve junction 100 via the nozzle opening 118, as is further described in connection with FIGS. 5-6), and/or a line end cap (e.g., a structure that prevents gas exterior to the universal pipe sleeve junction 100 from being drawn into the universal pipe sleeve junction 100 via the first end surface 108 or the second end surface 110, as is further described in connection with FIGS. 7-8) among other examples of pipe sleeve attachment mechanisms.

Figure 2:
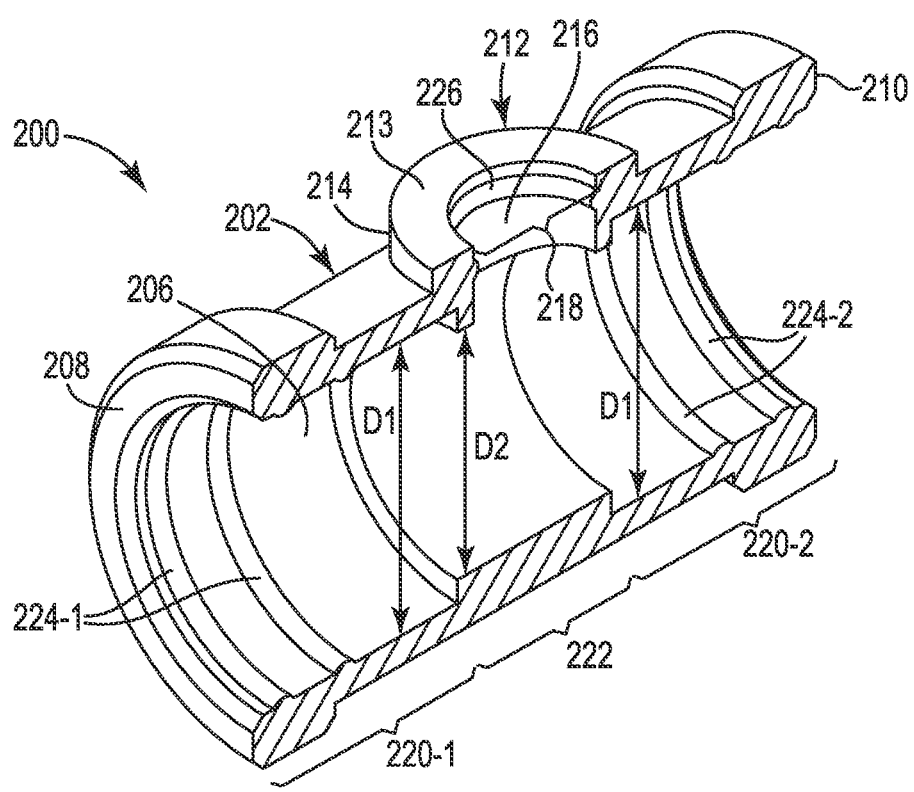
FIG. 2 is an example of a cross-sectional perspective view of a universal pipe sleeve junction for an aspirated smoke detection system, in accordance with one or more embodiments of the present disclosure.

FIG. 2 is an example of a cross-sectional perspective view of a universal pipe sleeve junction 200 for an aspirated smoke detection system, in accordance with one or more embodiments of the present disclosure. The universal pipe sleeve junction 200 is analogous to the universal pipe sleeve junction 100 illustrated in FIG. 1 and can include a sleeve body 202 having a first end surface 208, a second end surface 210, an inner surface 206, and a nozzle 212. The inner surface 206 of the sleeve body 202 can include a portion 220 with a first diameter, a portion 222 with a second diameter, and flanges 224-1, 224-2. The nozzle 212 can include a cap surface 213, an outer surface 214, an inner surface 216, and an opening 218. The inner surface 216 of the nozzle 212 can include a flange 226.

As previously described in connection with FIG. 1, the universal pipe sleeve junction 200 can be utilized in an aspirated smoke detection system and can include an inner surface 206 defining an opening through the sleeve body 202 of the universal pipe sleeve junction 200. The opening through the sleeve body 202 can be of a shape and/or dimension to receive a portion of a pipe (e.g., as is further described in connection with FIGS. 3-8) and/or a line end cap (e.g., as is further described in connection with FIGS. 7-8).

As illustrated in FIG. 2, the inner surface 206 of the sleeve body 202 can include a first portion 220 having a first diameter. For example, the inner surface 206 can have a first portion 220 having a diameter indicated in FIG. 2 as "D1". As illustrated in FIG. 2, the universal pipe sleeve junction 200 can include a portion on the left of the universal pipe sleeve junction 200 having diameter D1, indicated in FIG. 2 as sub-portion 220-1 of first portion 220 and a portion on the right of the universal pipe sleeve junction 200 having diameter D1, indicated in FIG. 2 as sub-portion 220-2 of first portion 220.

The sub-portions 220-1 and 220-2 of first portion 220 can be of equal lengths (e.g., measured from the first end surface 208 and/or second end surface 210 along a length of the universal pipe sleeve junction 200 towards the second portion 222). However, embodiments of the present disclosure are not so limited. For example, sub-portions 220-1 and 220-2 can be different lengths (e.g., the sub-portion 220-1 can be longer or shorter than the sub-portion 220-2).

As illustrated in FIG. 2, the inner surface 206 of the sleeve body 202 can include a second portion 222 having a second diameter. For example, the inner surface 206 can have a second portion 222 having a diameter indicated in FIG. 2 as "D2". The first diameter D1 can be greater than the second diameter D2. For example, the diameter of sub-portions 220-1 and 220-2 can include a diameter that is greater than the diameter of second portion 222.

As previously described in connection with FIG. 1, the inner surface 216 of the nozzle 212 can define an opening 218 of the nozzle 212. The opening 218 can extend through the sleeve body 202 of the universal pipe sleeve junction 200 to the second portion 222 of the inner surface 206 of the sleeve body 202. As a result, gas flowing from an exterior of the universal pipe sleeve junction 200 to the opening in the sleeve body 202 of the universal pipe sleeve junction 200 via an annulus of a calibrated sampling point cap can transit the nozzle 212 for use in smoke detection, as is further described in connection with FIGS. 3-4.

The first end surface 208 and/or the second end surface 210 can couple with a pipe at the sub-portion 220-1 and/or 220-2 of the inner surface 206 of the sleeve body 202, respectively. For example, an outer diameter of a pipe can be a same or similar diameter as diameter D1 such that the pipe can be received in the sub-portion 220-1 of the inner surface 206 of the sleeve body 202. Similarly, an outer diameter of a pipe can be a same or similar diameter as diameter D1 such that the pipe can be received in the sub-portion 220-2 of the inner surface 206 of the sleeve body 202. The inner diameter of the received pipe (e.g., at the sub-portions 220-1 and/or 220-2) can be the same as diameter D2, as is further described in connection with FIGS. 3-8.

The sleeve body 202 can include flanges 224-1, 224-2 located on the inner surface 206 of the sleeve body 202. As used herein, the term "flange" refers to a projecting rim. For example, flanges 224-1, 224-2 can project from the inner surface 206 of the sleeve body 202. The flanges 224-1, 224-2 can interact with an outer surface of a pipe received by the sleeve body 202 in order to provide an interference fit to couple with the pipe and/or couple with a line end cap, as well as seal the universal pipe sleeve junction 200 and the pipe and/or line end cap, as is further described herein.

As illustrated in FIG. 2, the first flanges 224-1 can project from the inner surface 206 of the sleeve body 202 and be located proximal to the first end surface 208. For example, the first flanges 224-1 can be located a distance from the first end surface 208 and project from the inner surface 206 of the sleeve body 202 to provide an interference fit to couple with the pipe, couple with a line end cap, and/or seal the universal pipe sleeve junction 200 and the pipe and/or line end cap.

Similarly, the second flanges 224-2 can project from the inner surface 206 of the sleeve body 202 and be located proximal to the second end surface 210. For example, the second flanges 224-2 can be located a distance from the second end surface 210 and project from the inner surface 206 of the sleeve body 202 to provide an interference fit to couple with the pipe, couple with a line end cap, and/or seal the universal pipe sleeve junction 200 and the pipe and/or line end cap.

Although the inner surface 206 of the universal pipe sleeve junction 200 is illustrated as having two first flanges 224-1 and two second flanges 224-2, embodiments of the present disclosure are not so limited. For example, the inner surface 206 can include less than two first flanges 224-1 or more than two first flanges 224-1. Similarly, the inner surface 206 can include less than two second flanges 224-2 or more than two second flanges 224-2. Additionally, although the inner surface 206 is described as having a same number of first flanges 224-1 and second flanges 224-2, embodiments of the present disclosure are not so limited. For example, the inner surface 206 can include a number of first flanges 224-1 (e.g., one) that is less than a number of second flanges 224-2 (e.g., two), or vice versa, among other differing amounts of flanges 224.

The inner surface 216 of nozzle 212 can define an opening 218 of the nozzle 212 extending through to the portion 222 of the inner surface 206 having the second diameter D2. The nozzle 212 can be integral with the sleeve body 202. For example, the sleeve body 202 and the nozzle 212 can be of the same material type and/or formed during the same manufacturing process (e.g., three-dimensional (3D) printing, injection molding, etc.).

The opening 218 of the nozzle 212 can couple with a pipe sleeve attachment mechanism. For example, an outer diameter of a portion of a pipe sleeve attachment mechanism can be a same or similar diameter as the portion of the inner surface 216 of the nozzle 212 such that the pipe sleeve attachment mechanism can be received in opening 218 of the nozzle 212.

The inner surface 216 of the nozzle 212 can include a nozzle flange 226. The nozzle flange 226 can project from the inner surface 216 of the nozzle 212. The nozzle flange 226 can interact with the outer surface of the pipe sleeve attachment mechanism in order to provide an interference fit to couple with the pipe sleeve attachment mechanism and/or seal the universal pipe sleeve junction 200 and the pipe sleeve attachment mechanism, as is further described herein.

As illustrated in FIG. 2, the nozzle flange 226 can project from the inner surface 216 of the nozzle 212 and be located proximal to the cap surface 213 of the nozzle 212. For example, the nozzle flange 226 can be located a distance from the cap surface 213 and project from the inner surface 216 of the nozzle 212 to provide an interference fit to couple with the pipe sleeve attachment mechanism, as is further described in connection with FIGS. 3-6.

Figure 3:
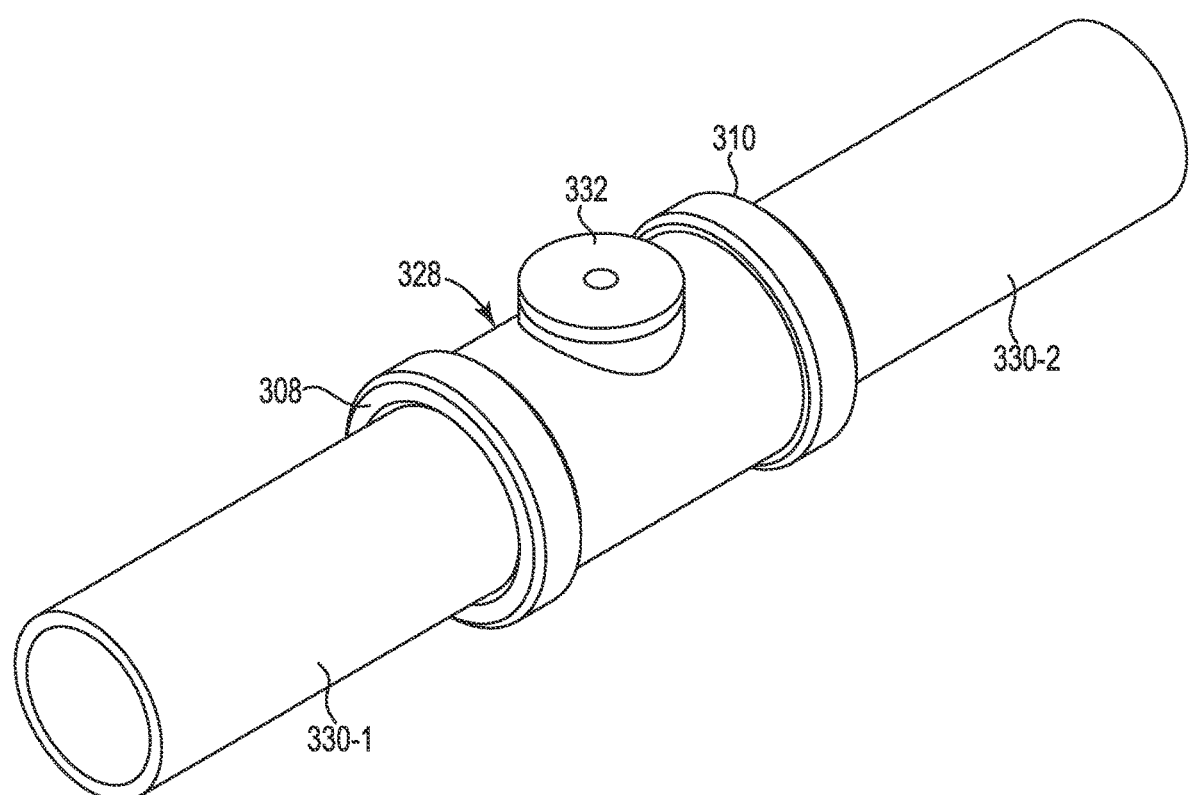
FIG. 3 is an example of a perspective view of a universal pipe sleeve junction for an aspirated smoke detection system coupled with pipes and a calibrated sampling point cap, in accordance with one or more embodiments of the present disclosure.

FIG. 3 is an example of a perspective view of a universal pipe sleeve junction 328 for an aspirated smoke detection system coupled with pipes 330-1, 330-2 and a calibrated sampling point cap 332, in accordance with one or more embodiments of the present disclosure. The universal pipe sleeve junction 328 is analogous to the universal pipe sleeve junction 100, 200, previously described in connection with FIGS. 1 and 2, respectively, and can include a first end surface 308 and a second end surface 310.

The first end surface 308 can couple with a pipe 330-1 and the second end surface 310 can couple with a pipe 330-2. For example, the inner surface (e.g., inner surface 106, 206, previously described in connection with FIGS. 1 and 2, respectively) can define an opening (e.g., opening 107, previously described in connection with FIG. 1) that can receive pipe 330-1 and 330-2.

Although not illustrated in FIG. 3 for clarity, the inner surface of the universal pipe sleeve junction 328 can include flanges as previously described in connection with FIG. 2. The flanges can create an interference fit between the universal pipe sleeve junction 328 and the pipes 330-1, 330-2 to create a seal between the inner surface of the sleeve body and the pipes 330-1, 330-2, as is further described in connection with FIG. 4.

As illustrated in FIG. 3, the universal pipe sleeve junction 328 can include a pipe sleeve attachment mechanism coupled to the nozzle opening (e.g., opening 118, 218, previously described in connection with FIGS. 1 and 2) of universal pipe sleeve junction 328. The pipe sleeve attachment mechanism can be a calibrated sampling point cap 332. As used herein, the term "calibrated sampling point cap" refers to a pipe sleeve attachment mechanism having a structure to allow gas exterior to the universal pipe sleeve junction 328 to be drawn into the universal pipe sleeve junction 328 to allow for smoke testing. For example, as illustrated in FIG. 3, the calibrated sampling point cap 332 can include an annulus of a predetermined calibrated size to draw gas from the exterior of the universal pipe sleeve junction 328 into the universal pipe sleeve junction 328, as is further described in connection with FIG. 4.

Figure 4:
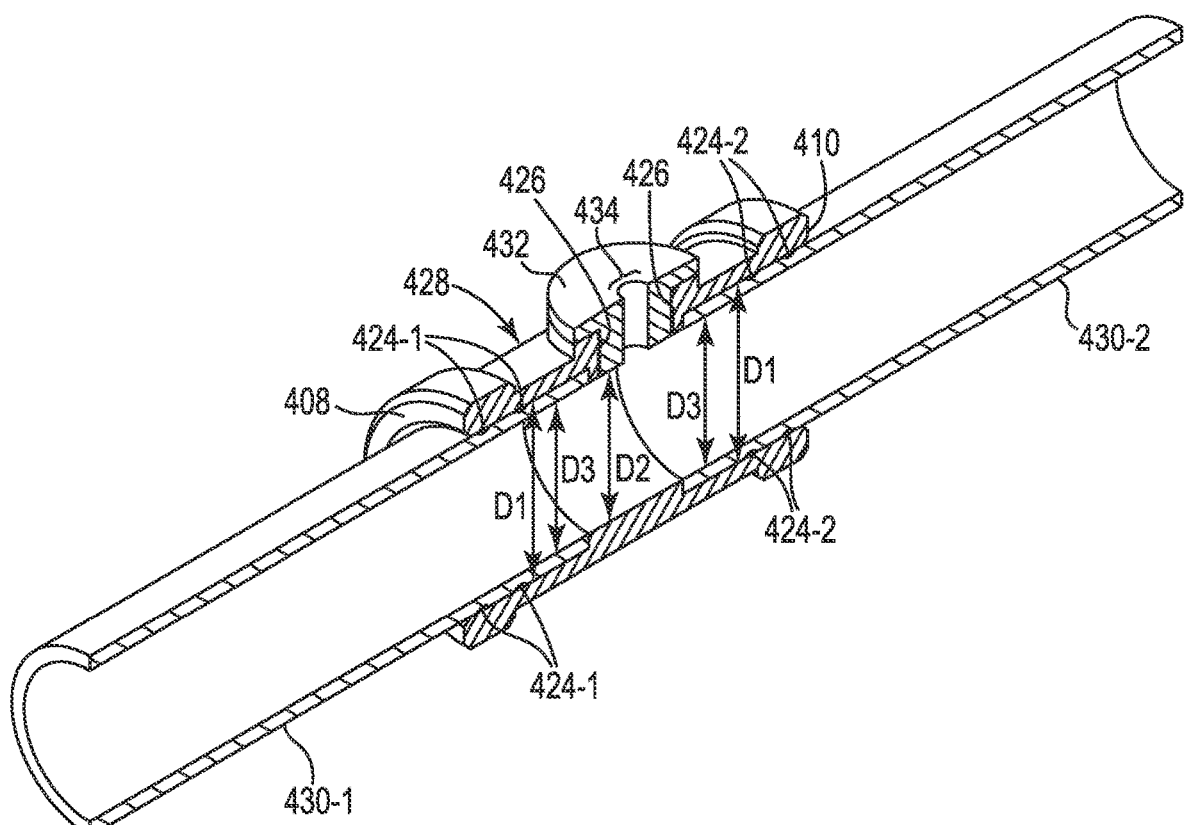
FIG. 4 is an example of a cross-sectional perspective view of a universal pipe sleeve junction for an aspirated smoke detection system coupled with pipes and a calibrated sampling point cap, in accordance with one or more embodiments of the present disclosure.

FIG. 4 is an example of a cross-sectional perspective view of a universal pipe sleeve junction 428 for an aspirated smoke detection system coupled with pipes 430-1, 430-2 and a calibrated sampling point cap 432, in accordance with one or more embodiments of the present disclosure. The universal pipe sleeve junction 428 is analogous to the universal pipe sleeve junction 100, 200, 328, previously described in connection with FIGS. 1, 2, and 3, respectively. The calibrated sampling point cap 432 is analogous to the calibrated sampling point cap 332, previously described in connection with FIG. 3, and can include an annulus 434 therethrough.

The first end surface 408 can couple with pipe 430-1 and the second end surface 410 can couple with pipe 430-2. As illustrated in FIG. 4, the universal pipe sleeve junction 428 can include flanges 424-1, 424-2. The first flanges 424-1 can create an interference fit between the universal pipe sleeve junction 428 and the pipe 430-1. Similarly, the second flanges 424-2 can create an interference fit between the universal pipe sleeve junction 428 and the pipe 430-2. The flanges 424-1 and 424-2 can seal the universal pipe sleeve junction 428 with the pipes 430-1, 430-2 to prevent gas in pipes 430-1, 430-2, and/or the universal pipe sleeve junction 428 from leaking to the exterior of the pipes 430-1, 430-2, and/or the universal pipe sleeve junction 428, as well as prevent gas located exterior to the pipes 430-1, 430-2, and/or the universal pipe sleeve junction 428 from entering the pipes 430-1, 430-2, and/or the universal pipe sleeve junction 428.

As illustrated in FIG. 4, an outer diameter of pipe 430-1 can be a same or similar diameter as diameter D1 such that the pipe 430-1 can be received in a portion of the inner surface of the sleeve body of the universal pipe sleeve junction 428 (e.g., sub-portion 220-1, previously described in connection with FIG. 2). Similarly, an outer diameter of pipe 430-2 can be a same or similar diameter as diameter D1 such that the pipe 430-2 can be received in a portion of the inner surface of the sleeve body of the universal pipe sleeve junction 428 (e.g., sub-portion 220-2, previously described in connection with FIG. 2). The inner diameter (e.g., "D3") of pipe 430-1 and the inner diameter of pipe 430-2 (e.g., "D3") can be a same or similar diameter as a portion of the inner surface of the sleeve body of the universal pipe sleeve junction 428 having diameter D2 (e.g., sub-portion 220-2, previously described in connection with FIG. 2). The same and/or similar diameters D2 and D3 can allow for gas to transit pipe 430-1, universal pipe sleeve junction 428, and pipe 430-2 while preventing unintended flow dynamics such as turbulent flow of gas around the universal pipe sleeve junction 428.

The universal pipe sleeve junction 428 can include a nozzle (e.g., nozzle 112, 212, previously described in connection with FIGS. 1 and 2, respectively) having a nozzle flange 426. The nozzle flange 426 can create a seal between the inner surface of the nozzle and the coupled sampling point cap 432 to prevent gas in the universal pipe sleeve junction 428 from leaking to the exterior of the universal pipe sleeve junction 428 between the calibrated sampling point cap 432 and the inner surface of the nozzle, as well as prevent gas located exterior to the universal pipe sleeve junction 428 from entering the universal pipe sleeve junction 428 between the calibrated sampling point cap 432 and the inner surface of the nozzle.

The calibrated sampling point cap 432 can include an annulus 434 therethrough. As used herein, the term "annulus" refers to a ring-shaped space. For example, the annulus 434 can be a space of a predetermined calibrated size extending through the calibrated sampling point cap 432 from a top surface of the calibrated sampling point cap 432 to the bottom surface of the calibrated sampling point cap 432 (e.g., as oriented in FIG. 4). The annulus 434 can define an opening (e.g., the space) through the calibrated sampling point cap 432 to the opening through the sleeve body of the universal pipe sleeve junction 428, such that a negative pressure inside the sleeve body of the universal pipe sleeve junction 428 (e.g., and the aspirated smoke detection system) can cause gas located outside of the universal pipe sleeve junction 428 to flow through the annulus 434 into the universal pipe sleeve junction 428. The gas transited through the annulus 434 of the calibrated sampling point cap 432 can be provided for smoke testing. In such a manner, the universal pipe sleeve junction 428 can join two portions of pipe 430-1, 430-2 without using glue and include a sampling point to draw air from various spaces in a facility to detect smoke without drilling sections of pipe to create sampling points, resulting in safer installation of the aspirated smoke detection system as well as faster testing and/or commissioning as compared with previous approaches.

Figure 5:
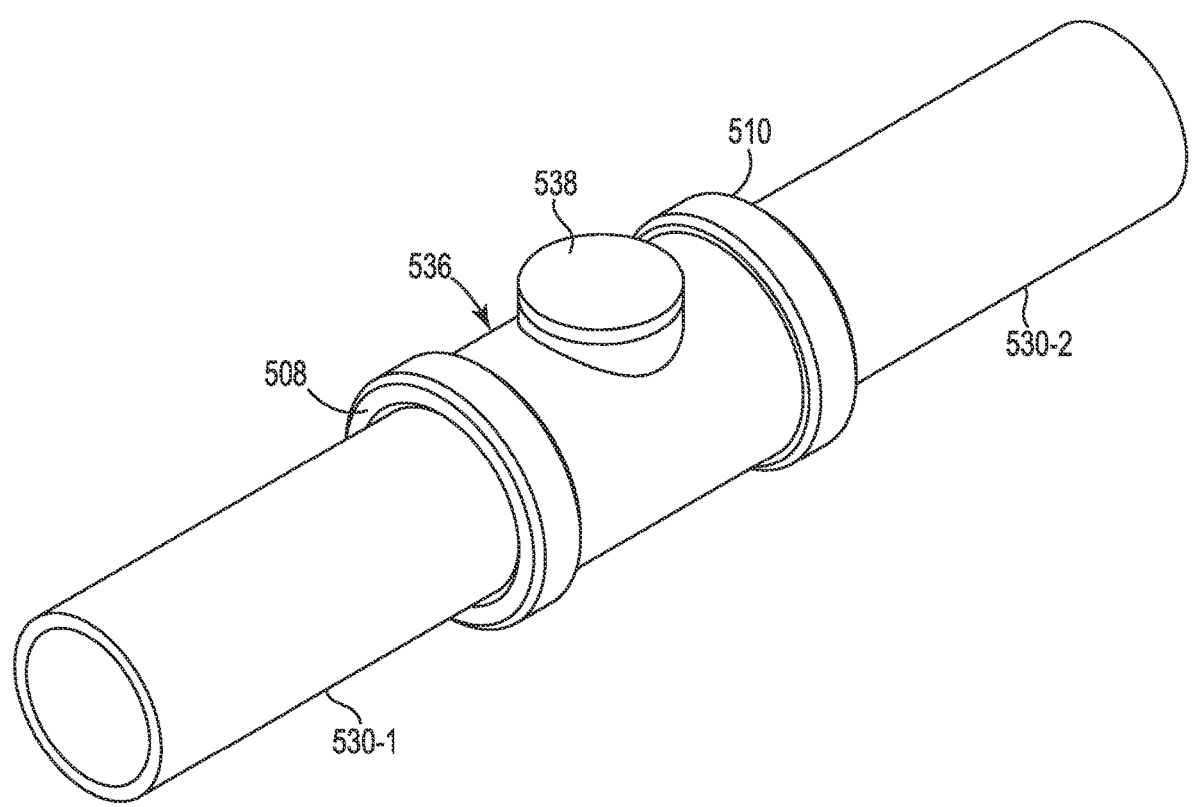
FIG. 5 is an example of a perspective view of a universal pipe sleeve junction for an aspirated smoke detection system coupled with pipes and a plug cap, in accordance with one or more embodiments of the present disclosure.

FIG. 5 is an example of a perspective view of a universal pipe sleeve junction 536 for an aspirated smoke detection system coupled with pipes 530-1, 530-2 and a plug cap 538, in accordance with one or more embodiments of the present disclosure. The universal pipe sleeve junction 536 is analogous to the universal pipe sleeve junction 100, 200, previously described in connection with FIGS. 1 and 2, respectively, and can include a first end surface 508 and a second end surface 510.

The first end surface 508 can couple with a pipe 530-1 and the second end surface 510 can couple with a pipe 530-2. For example, the inner surface (e.g., inner surface 106, 206, previously described in connection with FIGS. 1 and 2, respectively) can define an opening (e.g., opening 107, previously described in connection with FIG. 1) that can receive pipe 530-1 and 530-2.

Although not illustrated in FIG. 5 for clarity, the inner surface of the universal pipe sleeve junction 536 can include flanges. The flanges can create an interference fit between the universal pipe sleeve junction 536 and the pipes 530-1, 530-2 to create a seal between the inner surface of the sleeve body and the pipes 530-1, 530-2, as is further described in connection with FIG. 6.

As illustrated in FIG. 5, the universal pipe sleeve junction 536 can include a pipe sleeve attachment mechanism coupled to the nozzle opening (e.g., opening 118, 218, previously described in connection with FIGS. 1 and 2) of universal pipe sleeve junction 536. The pipe sleeve attachment mechanism can be a plug cap 538. As used herein, the term "plug cap" refers to a pipe sleeve attachment mechanism having a structure to prevent gas exterior to the universal pipe sleeve junction 536 from being drawn into the universal pipe sleeve junction 536. For example, as illustrated in FIG. 5, the plug cap can seal the nozzle of the universal pipe sleeve junction 536, allowing the universal pipe sleeve junction 536 to function as a junction such that gas can transit the pipe 530-1, universal pipe sleeve junction 536, and pipe 530-2, as is further described in connection with FIG. 6.

Figure 6:
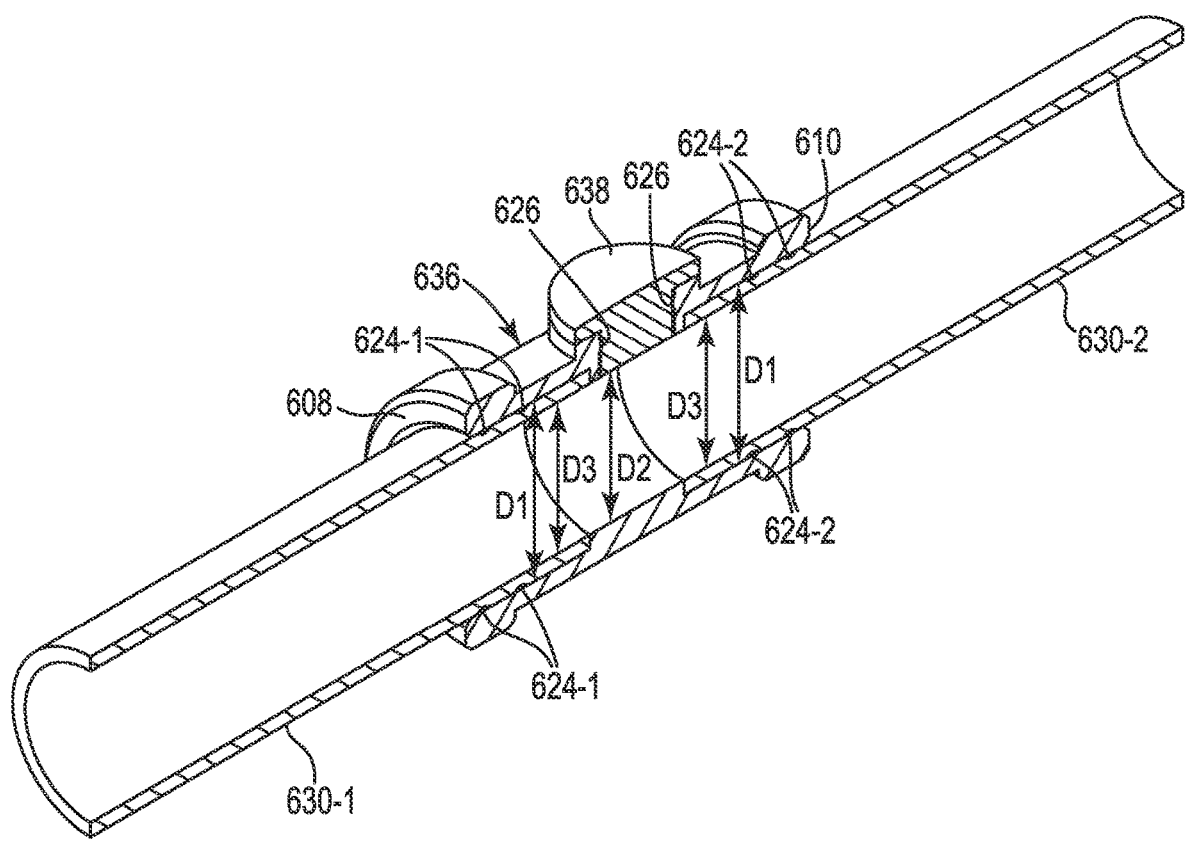
FIG. 6 is an example of a cross-sectional perspective view of a pipe sleeve for an aspirated smoke detection system coupled with pipes and a plug cap, in accordance with one or more embodiments of the present disclosure.

FIG. 6 is an example of a cross-sectional perspective view of a universal pipe sleeve junction 636 for an aspirated smoke detection system coupled with pipes 630-1, 630-2 and a plug cap 638, in accordance with one or more embodiments of the present disclosure. The universal pipe sleeve junction 636 is analogous to the universal pipe sleeve junction 100, 200, 536, previously described in connection with FIGS. 1, 2, and 5, respectively. The plug cap 638 is analogous to the plug cap 538, previously described in connection with FIG. 5.

The first end surface 608 can couple with pipe 630-1 and the second end surface 610 can couple with pipe 630-2. As illustrated in FIG. 6, the universal pipe sleeve junction 636 can include flanges 624-1, 624-2. The first flanges 624-1 can create an interference fit between the universal pipe sleeve junction 636 and the pipe 630-1. Similarly, the second flanges 624-2 can create an interference fit between the universal pipe sleeve junction 636 and the pipe 630-2. The flanges 624-1 and 624-2 can seal the universal pipe sleeve junction 636 with the pipes 630-1, 630-2 to prevent gas in pipes 630-1, 630-2, and/or the universal pipe sleeve junction 636 from leaking to the exterior of the pipes 630-1, 630-2, and/or the universal pipe sleeve junction 636, as well as prevent gas located exterior to the pipes 630-1, 630-2, and/or the universal pipe sleeve junction 636 from entering the pipes 630-1, 630-2, and/or the universal pipe sleeve junction 636.

As illustrated in FIG. 6, an outer diameter of pipe 630-1 can be a same or similar diameter as diameter D1 such that the pipe 630-1 can be received in a portion of the inner surface of the sleeve body of the universal pipe sleeve junction 636 (e.g., sub-portion 220-1, previously described in connection with FIG. 2). Similarly, an outer diameter of pipe 630-2 can be a same or similar diameter as diameter D1 such that the pipe 630-2 can be received in a portion of the inner surface of the sleeve body of the universal pipe sleeve junction 636 (e.g., sub-portion 220-2, previously described in connection with FIG. 2). The inner diameter (e.g., "D3") of pipe 630-1 and the inner diameter of pipe 630-2 (e.g., "D3") can be a same or similar diameter as a portion of the inner surface of the sleeve body of the universal pipe sleeve junction 636 having diameter D2 (e.g., sub-portion 220-2, previously described in connection with FIG. 2). The same and/or similar diameters D2 and D3 can allow for gas to transit pipe 630-1, universal pipe sleeve junction 636, and pipe 630-2 while preventing unintended flow dynamics such as turbulent flow of gas around the universal pipe sleeve junction 636.

The universal pipe sleeve junction 636 can include a nozzle (e.g., nozzle 112, 212, previously described in connection with FIGS. 1 and 2, respectively) having a nozzle flange 626. The nozzle flange 626 can create a seal between the inner surface of the nozzle and the coupled plug cap 638 to prevent gas in the universal pipe sleeve junction 636 from leaking to the exterior of the universal pipe sleeve junction 636 between the plug cap 638 and the inner surface of the nozzle, as well as prevent gas located exterior to the universal pipe sleeve junction 636 from entering the universal pipe sleeve junction 636 between the plug cap 638 and the inner surface of the nozzle. In such a manner, the universal pipe sleeve junction 636 can join two portions of pipe 630-1, 630-2 without using glue and function as a junction between the two portions of pipe 630-1, 630-2 resulting in faster testing and/or commissioning as compared with previous approaches.

Figure 7:
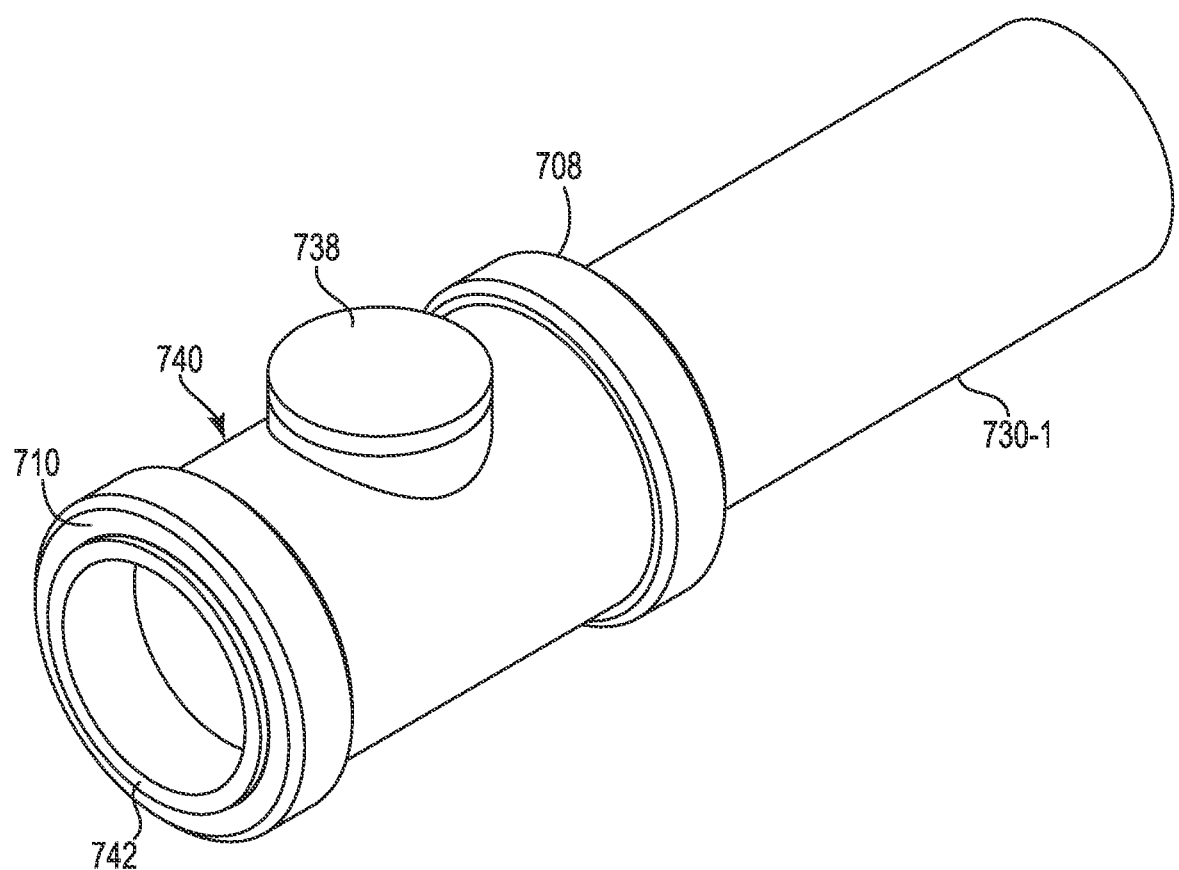
FIG. 7 is an example of a perspective view of a universal pipe sleeve junction for an aspirated smoke detection system coupled with a pipe, a line end cap, and a plug cap, in accordance with one or more embodiments of the present disclosure.

FIG. 7 is an example of a perspective view of a universal pipe sleeve junction 740 for an aspirated smoke detection system coupled with a pipe 730-1, a line end cap 742, and a plug cap 738, in accordance with one or more embodiments of the present disclosure. The universal pipe sleeve junction 740 is analogous to the universal pipe sleeve junction 100, 200, previously described in connection with FIGS. 1 and 2, respectively, and can include a first end surface 708 and a second end surface 710.

The first end surface 708 can couple with a pipe 730-1. For example, the inner surface (e.g., inner surface 106, 206, previously described in connection with FIGS. 1 and 2, respectively) can define an opening (e.g., opening 107, previously described in connection with FIG. 1) that can receive pipe 730-1.

Although not illustrated in FIG. 7 for clarity, the inner surface of the universal pipe sleeve junction 740 can include flanges. The flanges can create an interference fit between the universal pipe sleeve junction 740 and the pipe 730-1, as well as between the universal pipe sleeve junction 740 and the line end cap 742 to create a seal between the inner surface of the sleeve body, the pipe 730-1, and the line end cap 742, as is further described in connection with FIG. 8.

As illustrated in FIG. 7, the universal pipe sleeve junction 740 can include a pipe sleeve attachment mechanism coupled to the nozzle opening (e.g., opening 118, 218, previously described in connection with FIGS. 1 and 2) of universal pipe sleeve junction 740. The pipe sleeve attachment mechanism can be a plug cap 738. The plug cap 738 can seal the nozzle of the universal pipe sleeve junction 740 in a manner analogous to that previously described herein.

The universal pipe sleeve junction 740 can further include a different pipe sleeve attachment mechanism coupled to the second end surface 710. The different pipe sleeve attachment mechanism can be a line end cap 742. As used herein, the term "line end cap" refers to a pipe sleeve attachment mechanism having a structure to prevent gas exterior to the universal pipe sleeve junction 740 from being drawn into the universal pipe sleeve junction 740. The line end cap 742 can be used at the line end of the aspirated smoke detection system. For example, a line of pipe may extend a particular distance throughout the facility until a particular point (e.g., the line end), where the line of pipe can be sealed off using the universal pipe sleeve junction 740 in conjunction with the line end cap 742, as is further described in connection with FIG. 8.

Figure 8:
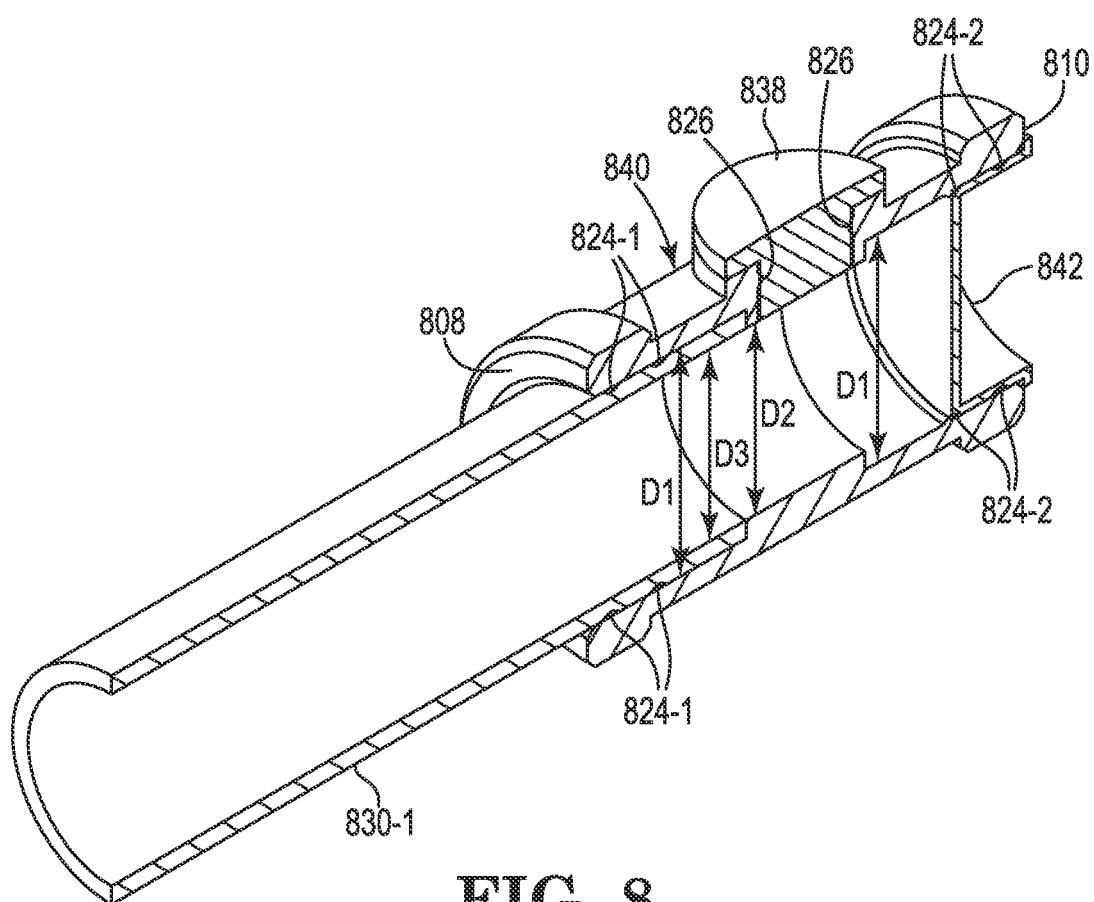
FIG. 8 is an example of a cross-sectional perspective view of a universal pipe sleeve junction for an aspirated smoke detection system coupled with a pipe, a line end cap, and a plug cap, in accordance with one or more embodiments of the present disclosure.

FIG. 8 is an example of a cross-sectional perspective view of a universal pipe sleeve junction 840 for an aspirated smoke detection system coupled with a pipe 830-1, a line end cap 842, and a plug cap 838, in accordance with one or more embodiments of the present disclosure. The universal pipe sleeve junction 840 is analogous to the universal pipe sleeve junction 100, 200, 740, previously described in connection with FIGS. 1, 2, and 7, respectively. The plug cap 838 is analogous to the plug cap 538, 638, 738 previously described in connection with FIGS. 5-7, respectively.

The first end surface 808 can couple with pipe 830-1 and the second end surface 810 can couple with the line end cap 842. As illustrated in FIG. 8, the universal pipe sleeve junction 840 can include flanges 824-1, 824-2. The first flanges 824-1 can create an interference fit between the universal pipe sleeve junction 840 and the pipe 830-1. Similarly, the second flanges 824-2 can create an interference fit between the universal pipe sleeve junction 840 and the line end cap 842. The flanges 824-1 and 824-2 can seal the universal pipe sleeve junction 840 with the pipe 830-1 and the line end cap 842 to prevent gas in pipe 830-1 and/or the universal pipe sleeve junction 840 from leaking to the exterior of the pipe 830-1 and/or the universal pipe sleeve junction 840, as well as prevent gas located exterior to the pipe 830-1 and/or the universal pipe sleeve junction 840 from entering the pipe 830-1 and/or the universal pipe sleeve junction 840.

As illustrated in FIG. 8, an outer diameter of pipe 830-1 can be a same or similar diameter as diameter D1 such that the pipe 830-1 can be received in a portion of the inner surface of the sleeve body of the universal pipe sleeve junction 840 (e.g., sub-portion 220-1, previously described in connection with FIG. 2). Similarly, an outer diameter of a portion of the line end cap 842 can be a same or similar diameter as diameter D1 such that the portion of the line end cap 842 can be received in a portion of the inner surface of the sleeve body of the universal pipe sleeve junction 840 (e.g., sub-portion 220-2, previously described in connection with FIG. 2). As illustrated in FIG. 8, the inner diameter (e.g., "D3") of pipe 830-1 can be a same or similar diameter as a portion of the inner surface of the sleeve body of the universal pipe sleeve junction 840 having diameter D2 (e.g., sub-portion 220-2, previously described in connection with FIG. 2).

The universal pipe sleeve junction 840 can include a nozzle (e.g., nozzle 112, 212, previously described in connection with FIGS. 1 and 2, respectively) having a nozzle flange 826. The nozzle flange 826 can create a seal between the inner surface of the nozzle and the coupled plug cap 838 to prevent gas in the universal pipe sleeve junction 840 from leaking to the exterior of the universal pipe sleeve junction 840 between the plug cap 838 and the inner surface of the nozzle, as well as prevent gas located exterior to the universal pipe sleeve junction 840 from entering the universal pipe sleeve junction 840 between the plug cap 838 and the inner surface of the nozzle.

Although the universal pipe sleeve junction 840 is illustrated as including a plug cap 838 with the line end cap 842, embodiments of the present disclosure are not so limited. For example, the universal pipe sleeve junction 840 can include a calibrated sampling point cap (e.g., sampling point cap 332, 432, previously described in connection with FIGS. 3 and 4, respectively) with the line end cap 842 such that the universal pipe sleeve junction 840 can draw air from various spaces to detect smoke.

In such a manner, the universal pipe sleeve junction 840 can cap pipe 830-1 without using glue and/or other different capping pieces, allowing for the use of a particular pipe sleeve to function in different ways. Using the universal pipe sleeve junction 840 in such a way can result in less parts and faster testing and/or commissioning of an aspirated smoke detection system as compared with previous approaches.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A universal pipe sleeve junction for an aspirated smoke detection system, comprising:

a sleeve body having an outer surface and an inner surface, the inner surface defining an opening through the sleeve body and including a first portion having a first diameter and a second portion having a second diameter, wherein the sleeve body further includes:
a first end surface;
a second end surface opposite the first end surface; and
a plurality of flanges located on the inner surface of the sleeve body and configured to couple with a pipe;
a nozzle having a cap surface, an outer surface, and an inner surface, the inner surface of the nozzle defining an opening from the cap surface through the nozzle and extending through to the inner surface of the sleeve body; and
a sampling point cap having a sampling point cap flange and an outer surface having a constant diameter, wherein:
the outer surface is configured to directly couple to the opening through the nozzle via an interference fit with the inner surface of the nozzle to create a seal between the inner surface of the nozzle and the outer surface of the sampling point cap, the sampling point cap having an annulus defining an opening through the sampling point cap such that a negative pressure inside the sleeve body is to cause gas located outside the universal pipe sleeve junction to flow through the annulus into the universal pipe sleeve junction for smoke testing; and
the sampling point cap flange abuts the cap surface when the outer surface of the sampling point cap is directly coupled to the opening, the sampling point cap flange having a diameter that is larger than the diameter of the outer surface of the sampling point cap.

2. The universal pipe sleeve junction of claim 1, the first diameter of the first portion of the inner surface is greater than the second diameter of the second portion of the inner surface.

3. The universal pipe sleeve junction of claim 1, wherein the opening through the nozzle extends through to only the second portion of the inner surface of the sleeve body.

4. The universal pipe sleeve junction of claim 1, wherein the plurality of flanges are located circumferentially around the inner surface of the sleeve body.

5. The universal pipe sleeve junction of claim 4, wherein the plurality of flanges project from the inner surface towards the opening through the sleeve body.

6. The universal pipe sleeve junction of claim 1, wherein at least one of the first end surface and the second end surface is configured to couple with the pipe at the first portion of the inner surface of the sleeve body.

7. The universal pipe sleeve junction of claim 1, wherein an inner diameter of the pipe is a same diameter as the second diameter of the second portion of the inner surface of the sleeve body so as to prevent turbulent flow of gas within the universal pipe sleeve junction.

8. The universal pipe sleeve junction of claim 1, wherein two flanges of the plurality of flanges are located proximal to and axially spaced apart from the first end surface.

9. The universal pipe sleeve junction of claim 1, wherein two flanges of the plurality of flanges are located proximal to and axially spaced apart from the second end surface.

10. A universal pipe sleeve junction for an aspirated smoke detection system, comprising:
a sleeve body having an outer surface and an inner surface, the inner surface defining an opening through the sleeve body and including a first portion having a first diameter and a second portion having a second diameter, wherein the sleeve body further includes:
a first end surface;
a first plurality of flanges on the inner surface and located proximal to the first end surface;
a second end surface opposite the first end surface; and
a second plurality of flanges on the inner surface and located proximal to the second end surface;
a nozzle integral with the sleeve body and having a cap surface, an outer surface, and an inner surface, the inner surface of the nozzle defining an opening from the cap surface through the nozzle and extending through to the second portion of the inner surface of the sleeve body; and
a sampling point cap having a sampling point cap flange and an outer surface having a constant diameter, wherein:
the outer surface is configured to directly couple to the opening through the nozzle via an interference fit with the inner surface of the nozzle to create a seal between the inner surface of the nozzle and the outer surface of the sampling point cap, the sampling point cap having an annulus defining an opening through the sampling point cap such that a negative pressure inside the sleeve body is to cause gas located outside the universal pipe sleeve junction to flow through the annulus into the universal pipe sleeve junction for smoke testing; and
the sampling point cap flange abuts the cap surface when the outer surface of the sampling point cap is directly coupled to the opening, the sampling point cap flange having a diameter that is larger than the diameter of the outer surface of the sampling point cap.

11. The universal pipe sleeve junction of claim 10, wherein:
the first plurality of flanges are configured to couple with a first pipe at the first end surface of the sleeve body; and
the second plurality of flanges are configured to couple with a second pipe at the second end surface of the sleeve body.

12. The universal pipe sleeve junction of claim 10, wherein the first plurality of flanges comprises a same number of flanges as the second plurality of flanges.

13. The universal pipe sleeve junction of claim 10, wherein the first plurality of flanges comprises a different number of flanges than the second plurality of flanges.

14. A universal pipe sleeve junction system for an aspirated smoke detection system, comprising:
a universal pipe sleeve junction comprising:
a sleeve body having an outer surface and an inner surface, the inner surface defining an opening through the sleeve body and including a first portion having a first diameter and a second portion having a second diameter, wherein the sleeve body further includes:
a first end surface;
a first flange on the inner surface of the sleeve body and located proximal to the first end surface;
a second end surface opposite the first end surface; and
a second flange on the inner surface of the sleeve body and located proximal to the second end surface; and
a nozzle integral with the sleeve body and having a cap surface, an outer surface, and an inner surface, the inner surface of the nozzle defining an opening from the cap surface through the nozzle and extending through to the inner surface of the sleeve body; and a sampling point cap having a sampling point cap flange and an outer surface having a constant diameter, wherein:

the outer surface is configured to directly couple to the opening through the nozzle via an interference fit with the inner surface of the nozzle to create a seal between the inner surface of the nozzle and the outer surface of the sampling point cap, the sampling point cap having an annulus defining an opening through the sampling point cap such that a negative pressure inside the sleeve body is to cause gas located outside the universal pipe sleeve junction to flow through the annulus into the universal pipe sleeve junction for smoke testing; and the sampling point cap flange abuts the cap surface when the outer surface of the sampling point cap is directly coupled to the opening, the flange having a diameter that is larger than the diameter of the outer surface of the sampling point cap.

15. The system of claim 14, wherein the system further includes a pipe having an outer surface configured to couple with the universal pipe sleeve junction at the first end surface such that the first flange is directly coupled with the outer surface to create an interference fit with the pipe.

16. The system of claim 15, wherein the first flange provides a seal between the sleeve body and the outer surface of the pipe to prevent gas located inside the universal sleeve pipe junction from flowing out of the universal pipe sleeve junction along the outer surface of the pipe.

17. The system of claim 14, wherein the inner surface includes a stepped surface oriented substantially perpendicularly to the first portion and the second portion.

18. The system of claim 17, wherein the system further includes a pipe configured to couple with the universal pipe sleeve junction at the first end surface such that the pipe is located directly adjacent to the step surface of the inner surface.

19. The system of claim 14, wherein the system further includes a line end cap configured to couple with the universal pipe sleeve junction at the second end surface such that the second flange is directly coupled with the line end cap to create an interference fit with the line end cap.

20. The system of claim 19, wherein the second flange provides a seal between the sleeve body and the line end cap to prevent gas located inside the universal sleeve pipe junction from flowing out of the universal pipe sleeve junction around the line end cap.

\* \* \* \* \*